United States Patent
Lee et al.

(10) Patent No.: US 11,668,680 B2
(45) Date of Patent: Jun. 6, 2023

(54) PLATE BENDING WAVE DIRECTION SENSOR

(71) Applicant: Toyota Motor Engineering & Manufacturing North America, Inc., Plano, TX (US)

(72) Inventors: Taehwa Lee, Ann Arbor, MI (US); Hideo Iizuka, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 247 days.

(21) Appl. No.: 17/142,501

(22) Filed: Jan. 6, 2021

(65) Prior Publication Data

US 2022/0214312 A1 Jul. 7, 2022

(51) Int. Cl.
*G01N 29/14* (2006.01)
*G01N 29/04* (2006.01)

(52) U.S. Cl.
CPC .......... *G01N 29/14* (2013.01); *G01N 29/041* (2013.01); *G01N 2291/0427* (2013.01)

(58) Field of Classification Search
CPC ........ G01N 29/14; G01N 29/07; G01N 29/11; G01N 29/46; G01N 29/069; G01N 29/041; G01N 2291/0427; G01N 2291/106
See application file for complete search history.

(56) References Cited

U.S. PATENT DOCUMENTS

| 9,843,858 | B1* | 12/2017 | Karunasiri | ............. | H04R 1/406 |
| 11,153,681 | B2 | 10/2021 | Lee et al. | | |
| 11,397,222 | B2 | 7/2022 | Lee et al. | | |
| 2011/0299701 | A1* | 12/2011 | Karunasiri | ............. | H04R 19/04 |
| | | | | | 438/51 |
| 2020/0370951 | A1* | 11/2020 | Kang | ....................... | G01H 7/00 |

FOREIGN PATENT DOCUMENTS

WO 2018074721 A1 4/2018

OTHER PUBLICATIONS

Lee et al., "Fano-Like Acoustic Resonance for Subwavelength Directional Sensing: 0-360 Degree Measurement," Adv. Sci., 7, id 1903101 (2020) 9 pages.
Esandiari, Y., "Parametric study of helmholtz resonator performance and effect of poroacoustic material in use in resonator design," Iowa State Univ. Masters Thesis (2017) 78 pages.
(Continued)

*Primary Examiner* — Suman K Nath
(74) *Attorney, Agent, or Firm* — Christopher G. Darrow; Darrow Mustafa PC (57) ABSTRACT

Devices for detecting plate bending, or flexural, waves include at least two mechanical resonators positioned on a plate in a specified configuration. Each mechanical resonator has an associated oscillation amplitude detector, such as a laser vibrometer, configured to detect resonant oscillation of the mechanical resonator in response to an incident flexural wave. A ratio of frequency-dependent oscillation data for each mechanical oscillator is compared to a calibration curve to determine the angle of incidence of the flexural wave.

20 Claims, 8 Drawing Sheets

(56) References Cited

OTHER PUBLICATIONS

Wang et al., "Superlensing effect for flexural waves on phononic thin plates composed by spring-mass resonators," AIP Adv., 9, id 085207 (2019) 5 pages.
Chen, Y. et al., "Enhanced flexural wave sensing by adaptive gradient-index metamaterials," Sci. Rep., 6 (2016) 12 pages.
Nguyen, M.D. et al., "Sound direction sensor with an acoustic channel," IEEE 23rd international Conference on Micro Electro Mechanical System (2010) pp. 655-658.
Wilmott, D. et al., "Bio-Inspired Miniature Direction Finding Acoustic Sensor," Scientific Reports 6, 29957 (2016) 8 pages.
Yi, S. et al., "Subwavelength angle-sensing photodetectors inspired by directional hearing in small animals," Nature Nanotechnology 13, 1143 (2019) pp. 1143-1147 and supplemental information, 36 pages total.

\* cited by examiner

Angle, θ = 0 deg

Plate Bending Wave

PLATE BENDING WAVE DIRECTION SENSOR

TECHNICAL FIELD

The present disclosure generally relates to structural acoustics and, more particularly, to devices for detection of the incident angle of plate bending waves.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Structural waves, acoustic waves propagating through solid structures, enable the presence of unwanted sound and vibration in many technologies. Plate bending waves, or flexural waves, which transversely flex a solid plate, are an important propagator of such vibrational energy undesirable in many instances. In the example of automobiles, plate bending waves contribute to the propagation of vibrational energy from the engine and from road friction throughout a vehicle.

Sensing of the incident angle of structural waves is useful in many scenarios, such as identifying the location of a vibration source. Systems for sensing incident angle of acoustic waves, generally, usually measure the difference in arrival time, or phase difference, at two or more spaced-apart wave sensors. A significant disadvantage of this approach is that it generally requires a substantial distance between the multiple sensors, making it very difficult to use a compact design. Thus, such phase-difference acoustic direction sensing systems are very difficult to adapt to applications requiring, or benefiting from, a small size.

Accordingly, it would be desirable to provide an improved system for sensing or detecting incident angle of plate bending waves, a system that does not require a significant spatial distance between multiple sensors. Such a system would be amenable to smaller designs and more compact utilizations.

SUMMARY

This section provides a general summary of the disclosure, and is not a comprehensive disclosure of its full scope or all of its features.

In various aspects, the present teachings provide a flexural wave direction sensor. The sensor includes a plate and first and second mechanical resonators positioned on the plate and configured to oscillate in response to an incident flexural wave. The sensor further includes first and second oscillation amplitude detectors, each associated with a different mechanical oscillator and positioned to detect oscillation amplitude of the associated resonator. The sensor can include a controller configured to receive and Fourier transform oscillation amplitude data from each oscillation amplitude detector, to generate a ratio of transformed oscillation amplitude from the various sensors, and to compare the ratio to a calibration data set.

In other aspects, the present teachings provide a sensor for 360° angle detection of an incident flexural wave. The sensor includes a plate and at least three mechanical resonators positioned radially on the plate, such that each of resonator defines a vertex of an equilateral polygon. Each mechanical resonator is configured to oscillate in response to an incident flexural wave. The sensor further includes at least three oscillation amplitude detectors, one associated with each mechanical resonator to detect oscillation of the mechanical resonator with which it is associated.

In still other aspects, the present teachings provide a method for locating the source of a flexural wave propagating in a structural plate. The method includes a step of detecting oscillation amplitude of two or more mechanical resonators positioned on the plate. The method further includes a step of generating oscillation amplitude data, using an oscillation amplitude detector associated with each mechanical resonator. The method further includes a step of processing oscillation amplitude data via Fourier transform to produce a frequency domain data set. The method also includes steps of selecting a frequency of interest from the frequency domain data set, and comparing the resonance response, at the selected frequency, to a calibration data set to obtain an angle of incidence of the flexural wave on the two mechanical resonators Further areas of applicability and various methods of enhancing the disclosed technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide devices for detecting the incident angle of flexural waves. A disclosed device can be substantially smaller than the wavelength of the detected flexural wave, and therefore is amenable to compact utilizations. The disclosed structures provide scattering, at or near a resonance frequency, of waves propagating through a solid structure, with very high efficiency.

A device of the present teachings has two mechanical resonators positioned adjacent to one another on a plate or solid structure capable of transmitting a flexural wave. Each mechanical resonator has an associated transducer configured to detect oscillation of the resonator. Each resonator will resonate to the extent that a flexural wave, at or near the resonance frequency of the resonator, is incident on that resonator. Each transducer will generate an electric signal in proportion to the resonance of its resonator. The incidence angle of the flexural wave is thus determined by the power ratio of the transducers associated with the two resonators.

Figure 1A:
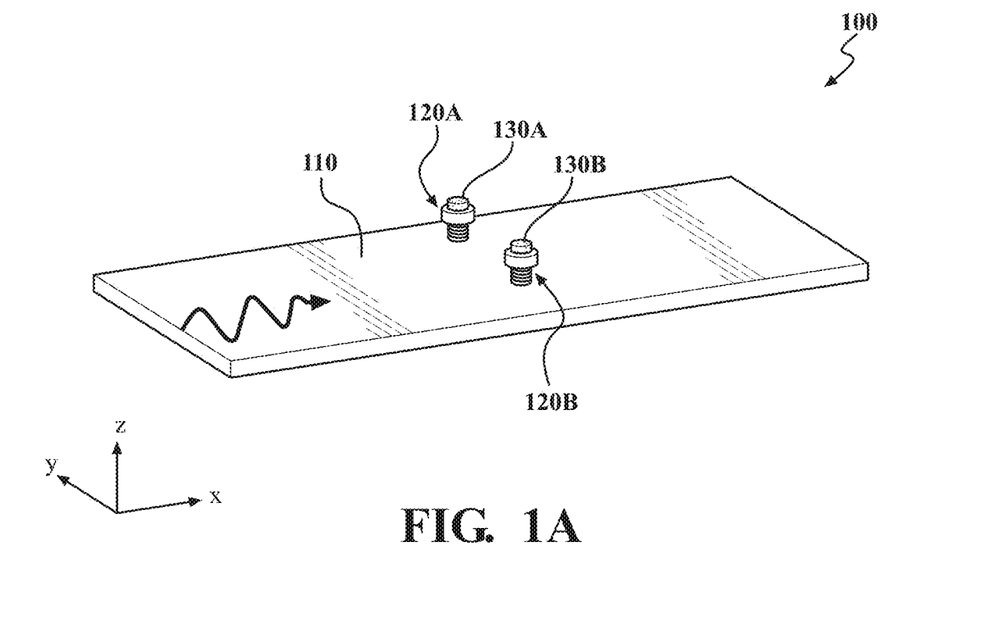
FIG. 1A is a perspective view of a device for detecting incident angle of a plate bending wave, the device having two adjacent mechanical resonators positioned on a plate.
Figure 1B:
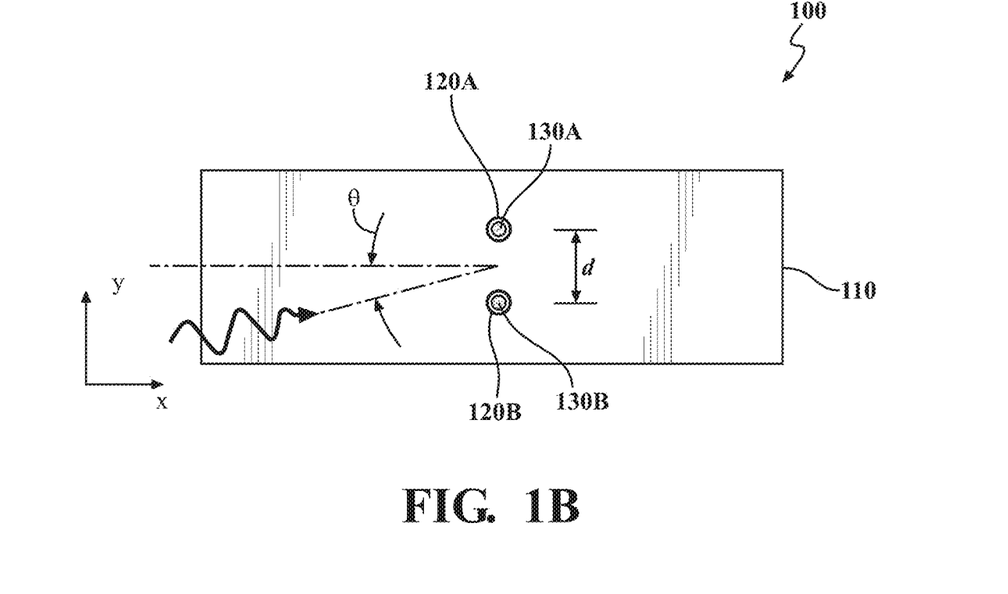
FIG. 1B is a top plan view of the device of FIG. 1A.
Figure 1C:
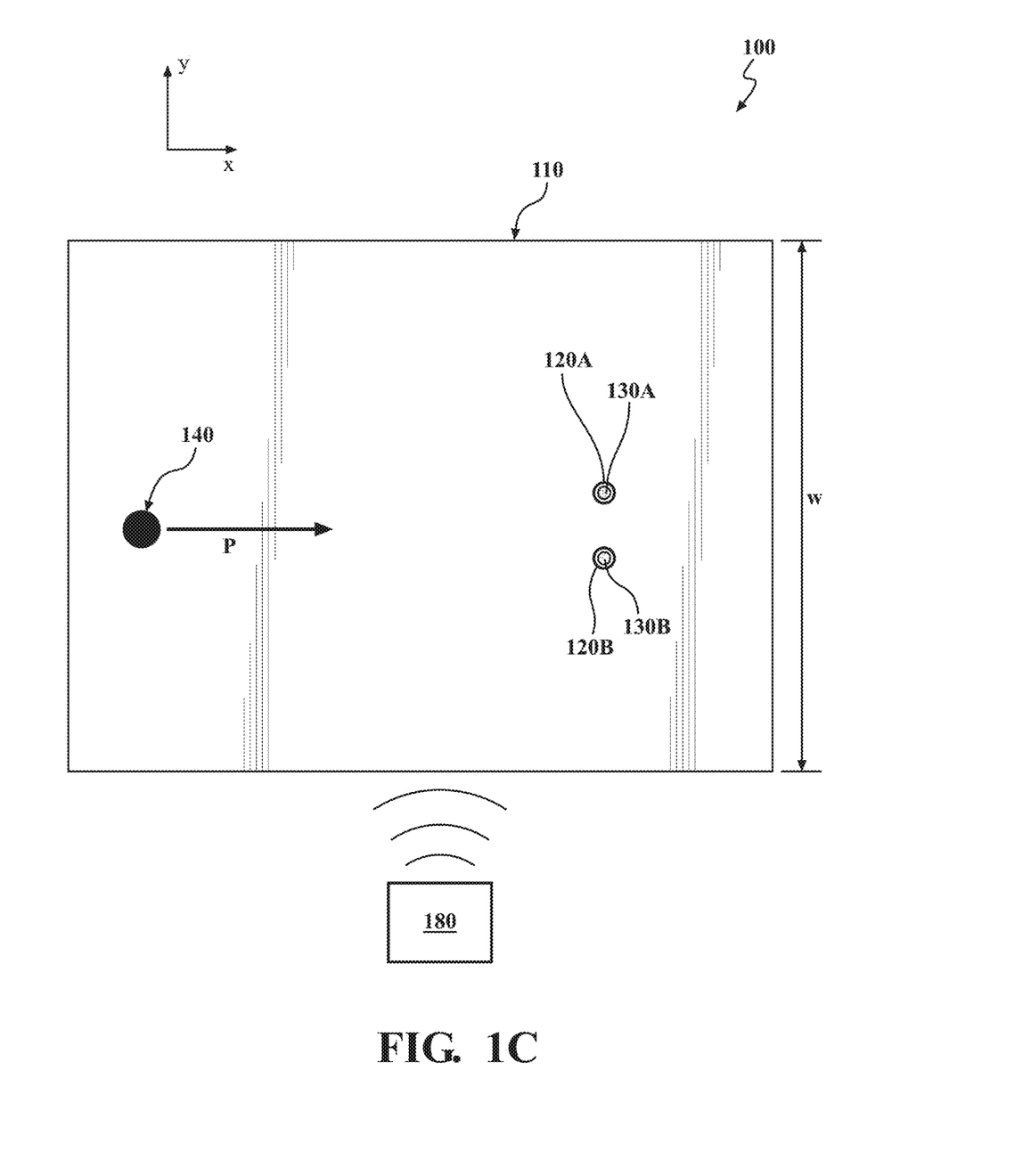
FIG. 1C is a top plant view of a device of the type shown in FIGS. 1A and 1B, and including a flexural wave source.

FIGS. 1A and 1B show a perspective view and a top plan view, respectively, of an exemplary device 100 (alternatively referred to herein as a sensor 100), of the present teachings, for detection of the incident angle of an acoustic wave. The device 100 includes a sound conducting substrate that, for example purposes, is depicted as a solid, substantially planar plate 110. In one example, the plate can be 3 mm thick aluminum. The device 100 further includes at least two mechanical resonators 120A, 120B positioned adjacent to one another, and separated by a distance, d. It will be noted that the arrow, d, in FIG. 1B also defines a direction of separation of the mechanical resonators 120A, 120B. The device 100 also includes at least two oscillation amplitude detectors 130A, 130B, for detecting and measuring oscillation amplitude of a mechanical resonator 120A, 120B. Each oscillation amplitude detector 130A, 130B is further configured to generate a signal, such as a digital or electronic signal, indicative of the detected and measured oscillation amplitude. In general, one oscillation amplitude detector 130A, 130B will be associated with each mechanical resonator 120A, 120B. In some instances below, reference will be made to a mechanical resonator 120 in general, rather than to a specific mechanical resonator 120A, 120B. Similarly, in some instances, reference will be made to an oscillation amplitude detector 130 in general, rather than to a specific oscillation amplitude detector 130A, 130B. FIG. 1C shows a top plan view of a device 100 of FIGS. 1A and 1B including a flexural wave source 140 and a controller 180.

Figure 2A:
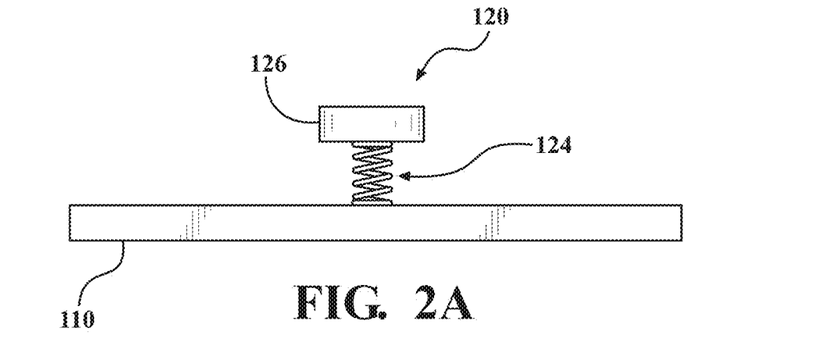
FIGS. 2A-2C are side plan views of three variations of a mechanical resonator of the device of FIGS. 1A and 1B.
Figure 2B:
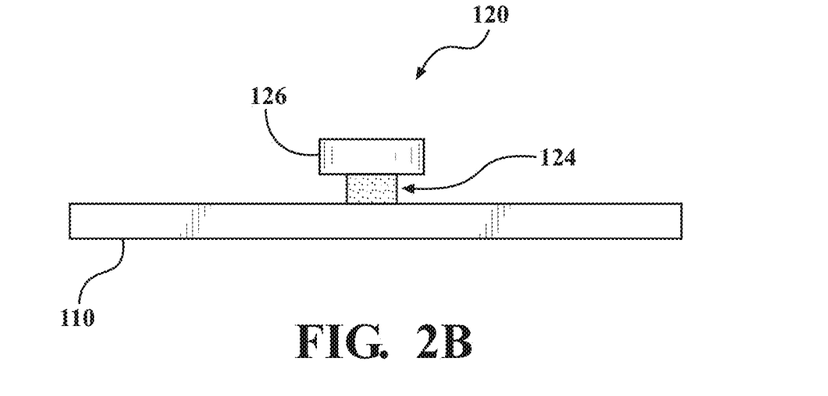
Figure 2C:
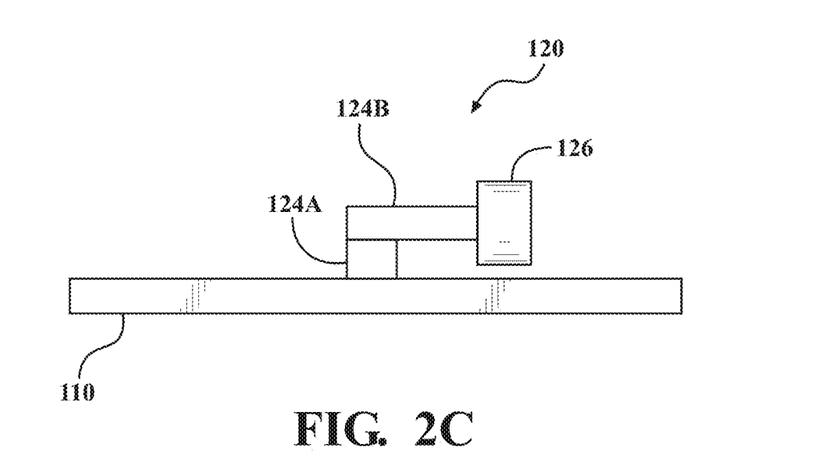

FIGS. 2A-2C show side plan views of different embodiments of a mechanical resonator 120 mounted on a plate 110 that can be used with the device 100. All three embodiments have a resilient member 124, with a weighted member 126 at the distal end—the end opposite the plate 110. In the embodiment of FIG. 2A, the resilient member 124 is a spring component, such as a coiled spring. In the embodiment of FIG. 2B, the resilient member 124 is a piece of elastomeric material, such as natural or synthetic rubber, polyurethane, or silicone. In the example of FIG. 2C, the resilient member includes a base portion 124A attached to the plate 110 and formed of a rigid or semi-rigid material. An elongated oscillating portion 124B, substantially parallel to the plate 110 and formed of a less rigid elastic material, is attached to the base portion opposite the plate 110. The base portion 124A keeps the oscillating portion 124B off of the plate 110, while the oscillating portion 124B essentially acts as an elastic pendulum on which the weighted member 126 can oscillate.

Each mechanical resonator 120 in the device 100 has a resonance frequency, $f_0$, as indicated by Equation 1:

$$f_0 = \frac{1}{2\pi}\sqrt{\frac{k}{m}}, \qquad 1$$

where k is the spring constant of the resilient member 124 and m is the mass of the weighted member 126. In certain examples presented below, the spring constant, k, is $2.5 \times 10^5$ N/m (Newtons per meter), and the mass, m, of the weight is 3.8 g, so that $f_0$ is about 1290 Hz.

Thus, when an incident wave at or near the resonance frequency, $f_0$, is incident on one of the at least one mechanical resonators 120A, 120B, that resonator will resonate. As noted above, a device of the present teachings includes an oscillation amplitude detector 130A, 130B associated with each mechanical resonator 120A, 120B. Each oscillation amplitude detector 130A, 130B is configured to generate an electronic signal in response to resonance of the mechanical resonator 120A, 120B with which it is associated.

Figure 3A:
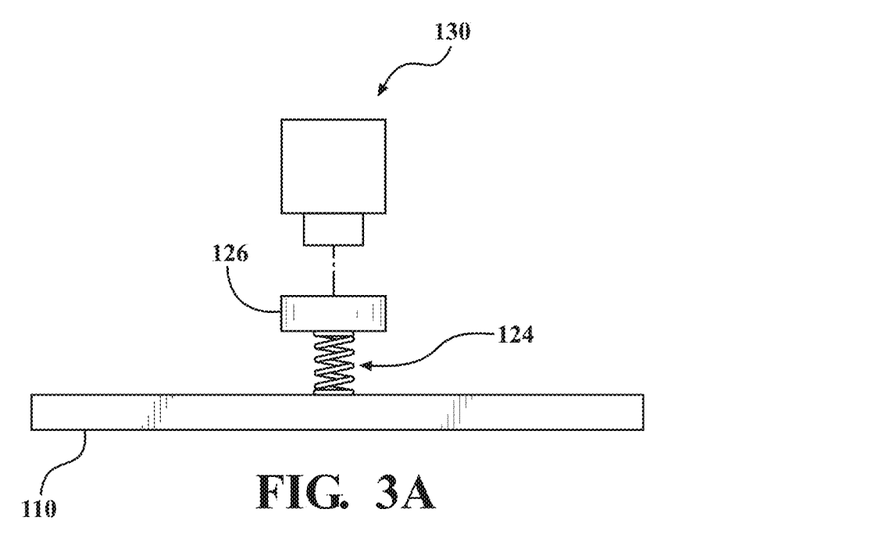
FIGS. 3A and 3B are side plan views of mechanical resonators, each showing a different variation of oscillation amplitude sensors used in the device of FIGS. 1A and 1B.
Figure 3B:
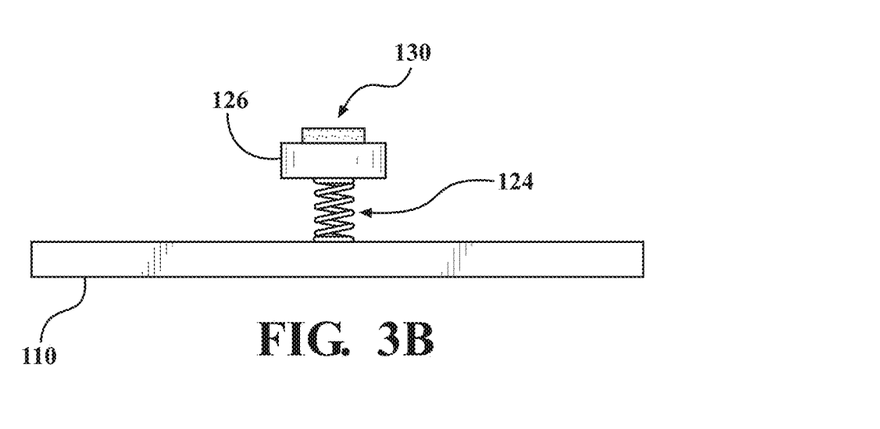

FIGS. 3A and 3B show side schematic views of two examples of oscillation amplitude detectors 130 for detecting oscillation amplitude of a mechanical resonator 120. In the example of FIG. 3A, a laser vibrometer 130' is positioned above the mechanical resonator 120 (i.e. the laser vibrometer is positioned farther from the plate 110 than is the mechanical resonator 120), with the laser directed at weighted member 126. In the example of FIG. 3B, an accelerometer 130" is attached to the weighted member 126 of the mechanical resonator 120. In the latter case, it will be understood that the accelerometer 130" becomes part of the weighted member 126 in that the mass of the accelerometer becomes part of the mass of the weighted member 126 for the purpose of determining the resonance frequency, $f_0$. In general, the oscillation amplitude detector can be any device suitable for measuring oscillation of the mechanical resonator 120. With reference to FIGS. 1A and 1B, it will be understood that the oscillation amplitude detector 130A will generate an electronic signal when the mechanical resonator 120A resonates; and the oscillation amplitude detector 130B will generate an electronic signal when the mechanical resonator 120B resonates.

It will generally be preferable that each oscillation amplitude detector 130A, 130B generates an electronic signal only when its associated mechanical resonator 120A, 120B resonates, and not when an unassociated resonator resonates. Thus, for example, the oscillation amplitude detector 130A will preferably generate an electronic signal when its associated mechanical resonator 120A resonates, but not generate an electronic signal (or generate only a minimal electronic signal) when another mechanical resonator 120B resonates. This is easily achieved in the case where an oscillation amplitude detector 130A, 130B is positioned as shown in FIG. 3A or 3B, as resonance of any mechanical resonator 120A, 120B will only be readily detectable by its associated oscillation amplitude detector 130A, 130B.

The bending plate wavelength corresponding to a given frequency, f, is indicated by the Equation 2:

$$\lambda = 2\pi \sqrt[4]{\frac{D}{\rho t(2\pi f)^2}}, \qquad 2$$

where $\rho$ is the plate density, t is plate thickness, and D is plate bending stiffness, and f is the frequency of the flexural wave propagating through the plate. The plate bending stiffness, D, is further related to elastic modulus and Poisson's ratio as indicated by Equation 3:

$$D = \frac{Et^3}{12(1-v^2)}, \qquad 3$$

where E is plate elastic modulus, and v is Poisson's ratio of the material from which the plate 110 is formed. In certain implementations, the plate 110 can be formed of a metal, such as aluminum. In the case of aluminum, elastic modulus, E, and Poisson's ratio, v, 90 GPa and 0.33, respectively, yielding a plate bending stiffness of 52.37 N·m. Given plate density, $\rho$ (2700 kg/m$^3$ in the case of aluminum) and plate thickness, t (3 mm in certain examples discussed below), wavelength, $\lambda$, is readily calculated for any frequency. With continued reference to FIG. 1B, the distance of separation between adjacent mechanical resonators 120A, 120B can be within a range of from about $\lambda/10$ to about $\lambda/5$, where $\lambda$ is a wavelength of interest such as an expected wavelength of an incident flexural wave.

In some implementations, such as the example of FIG. 1C, the device 100 can include a flexural wave source 140, a mechanism or structure operable to generate a flexural wave on the plate 110, at a position defined by the flexural wave source 140. For example, the flexural wave source 140 could be a structure that strikes a surface of the plate 110, or any other structure or mechanism operable to generate a flexural wave in the plate 110. The flexural wave source can be a point source, a linear source, or any other shape. In many such implementations, a flexural wave generated by the flexural wave source 140 can be a target flexural wave having wavelength, l, corresponding to a frequency that is equal or near to the resonance frequency, $f_0$, of the mechanical resonators 120A, 120B.

A flexural wave incidence angle, $\theta$, is defined by a direct path along the plate 110 from the flexural wave source 140 to the mechanical resonators 120A, 120B. If the propagation path of the flexural wave is orthogonal to the direction of separation between the mechanical resonators 120A, 120B, the incidence angle is zero.

Figure 4A:
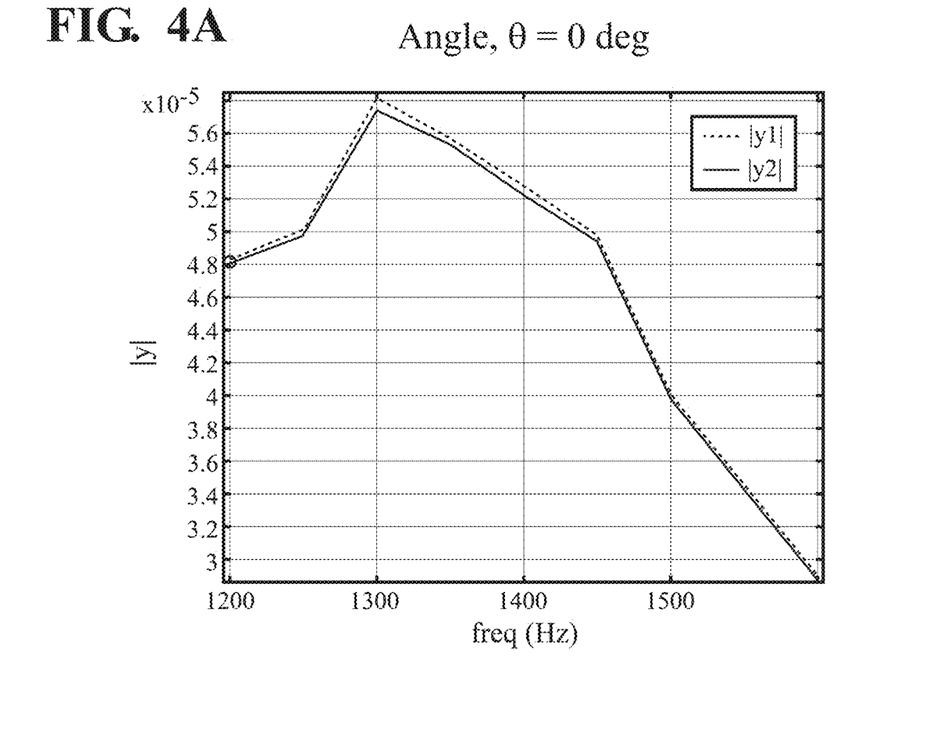
FIG. 4A is a plot of oscillation amplitude as a function of incident wave frequency at a zero degree angle for a device of FIGS. 1A and 1B.
Figure 4B:
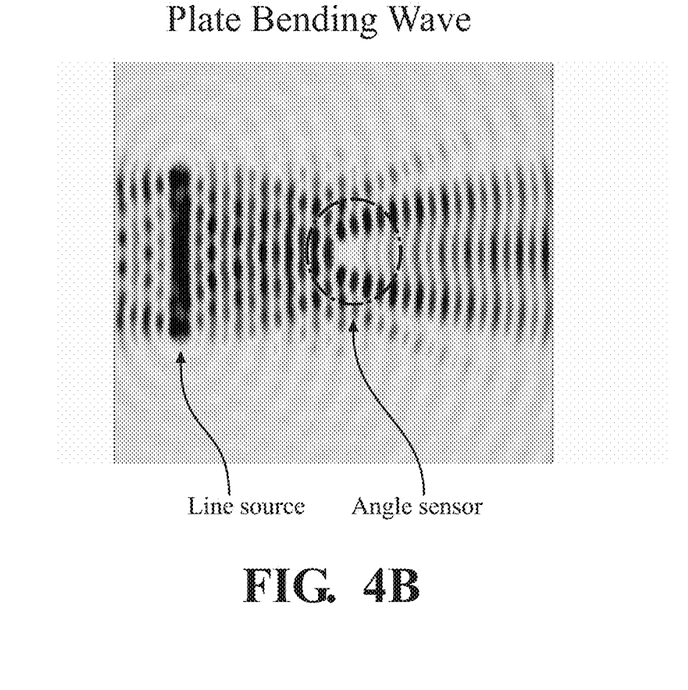
FIG. 4B is a is a calculated displacement field for a device of FIGS. 1A and 1B.

FIG. 4A shows a plot of simulated two-channel signal output for a device of FIGS. 1A and 1B, with an incident flexural wave angle of zero degrees, at varying wavelength. The two channels (y1, y2) correspond to the output from the two oscillation amplitude detectors 130A, 130B. The results confirm that, when incidence angle is zero, both resonators are excited equally, with a maximum at approximately the resonance frequency. FIG. 4B shows a displacement field of wave propagation across the plate in the device of FIG. 4A. The wave source is a line source, and the resonators cause downstream wave scattering. It thus be understood that when an incoming flexural wave is incident at a non-zero angle, $\theta$, the first-contacted mechanical resonator 120A, 120B will absorb a portion of the energy and also create downstream scattering. These effects will dampen the wave energy and resonance at the other mechanical resonator 120B, 120A, thus resulting in a power response ratio from the oscillation amplitude detectors 130A, 130B. This response ratio, as a function of incidence angle, then serves as a fingerprint for determining the angle of incidence of an incoming flexural wave.

Figure 4C:
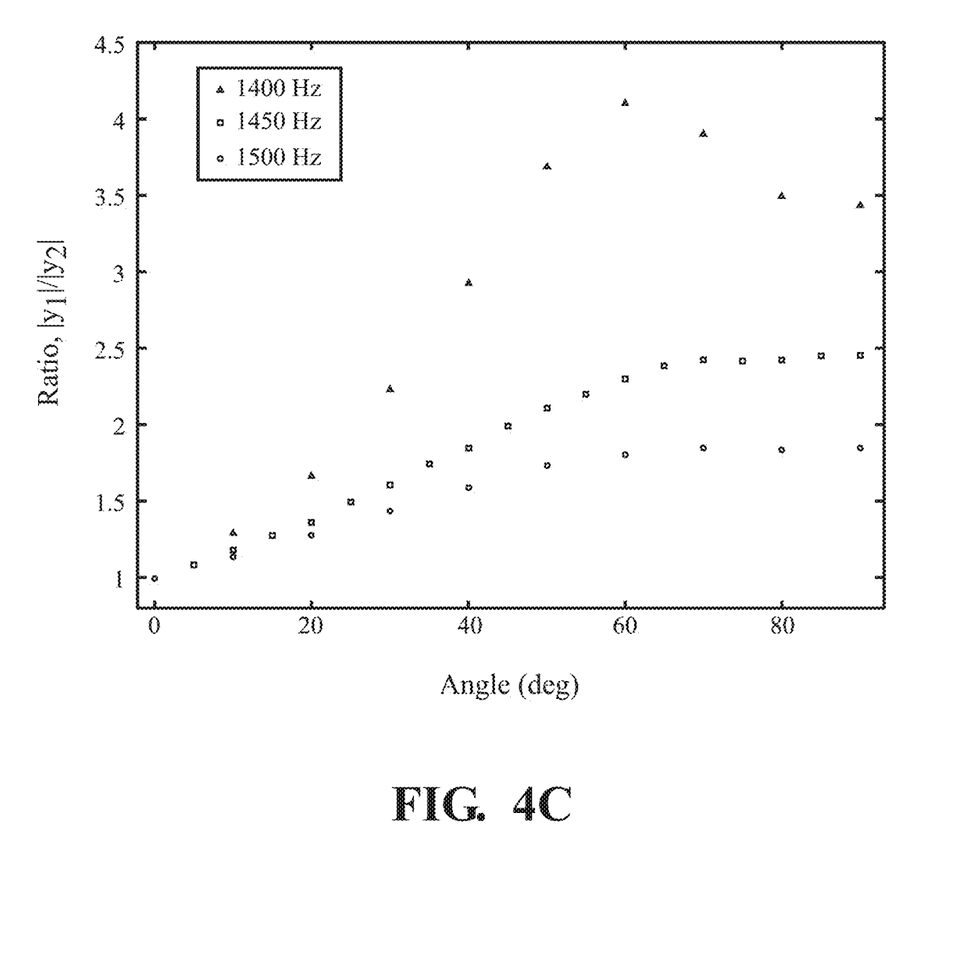
FIG. 4C is a graph of simulated acoustic power ratio as a function of incidence angle for a sensor of the type shown in FIGS. 1A and 1B.

FIG. 4C provides an example of this, showing excitation or response ratio (y1/y2) of the two mechanical resonators 120A, 120B for a device 100 of FIGS. 1A and 1B as a function of flexural wave angle of incidence, $\theta$. FIG. 4C presents excitation ratio data (y1/y2) independently for incident flexural waves of three different frequencies (1400, 1450, and 1500 Hz). The data of FIG. 4C confirm that as the angle of incidence orients toward one of the mechanical resonators, e.g. 120A, the response ratio, y1/y2 increases, reaching a maximum at an incident angle of about 60° to 90° at the tested frequencies. At 1500 Hz, the power ratio reaches a maximum at about 60° and then exhibits a modest dip and plateau to 90°. It will be understood that, in many implementations, it may be simpler to determine acoustic incidence angle when there is a continuous increase in power ratio with increasing angle up to 90° so that there are no instances of different angles with the same power ratio. For this reason, it may be preferable to monitor incidence angle for frequencies that fit this profile, such as frequencies less than 1500 Hz in the example of FIG. 4C. At the same time, it will be understood that detection sensitivity is greatest when the frequency of the detected wave closely matches $f_0$ of the device 100, i.e. 1500 Hz in the example of FIG. 4A. In such a case, and where high sensitivity is required, it may be suitable to monitor acoustic incidence angle across a narrower window, such as ±60°.

Because the response ratio shown is y1/y2, and not y2/y1, only ratios greater than one are shown at positive angles. It will be understood that a curve of y2/y1$_A$ would be a mirror image of the curve of y1/y2, with a maximum at about −60° to −90°. As shown in FIG. 4C, the difference in response (i.e. response ratio) is strongest at an incident frequency near the resonance frequency, $f_0$, but is still substantial at frequencies fifty to one hundred Hz distal from the resonance frequency.

The results of FIG. 4C illustrate how a device 100 of the present teachings can detect incident angle of a flexural wave, and how such a device can be incorporated into a system for sound source localization. A device 100 of the type shown in FIGS. 1A and 1B can be placed in signal communication with a controller programmed to compare an incoming signal to a recorded response curve comparable to the curve shown in FIG. 4C. It will be understood that, while oscillation of the mechanical resonators 120A, 120B will be at the resonance frequency, the signals generated by the oscillation amplitude detectors 130A, 130B can be Fourier transformed to determine the frequency of the incident wave.

It will be noted that the device having two mechanical resonators 120A, 120B and two oscillation amplitude detectors 130A, 130B can have difficulty distinguishing incident flexural waves approaching from opposite sides of the resonator pair. For example, it could be difficult to distinguish a flexural wave having an incident angle of 60° from a flexural wave having an incident angle of 120°, utilizing the design shown in FIGS. 1A and 1B. Thus, in some variations, a device 100 of the present teachings can have three or more mechanical resonators 120, to enable incident angle detection of a flexural wave across 360°.

Figure 5:
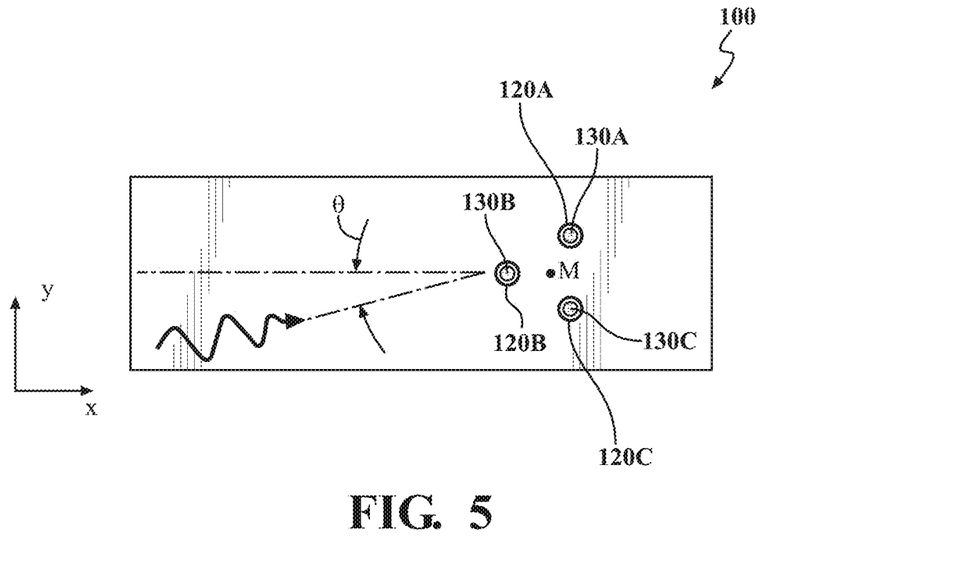
FIG. 5 is a top plan view of a variation of the device of FIGS. 1A and 1B, and having three mechanical resonators.

FIG. 5 shows a variation of the device 100 of the present teachings, having three mechanical resonators 120A, 120B, 120C radially arrayed about a midpoint, M. The three mechanical resonators 120A, 120B, 120C can be regarded as being positioned at the vertices of an equilateral triangle. As above, each of the mechanical resonators 120A, 120B, 120C has an associated oscillation amplitude detector 130A, 130B, 130C. A device 100 according to this variation can have three or more mechanical resonators 120, each positioned radially around a midpoint, i.e. at the vertices of an equilateral polygon—although there is generally expected to be little advantage to a number greater than three.

It will be understood that the device of FIG. 5, having three mechanical resonators/oscillation amplitude detectors, operates in the same manner as does the device of FIGS. 1A and 1B having two mechanical resonators/oscillation amplitude detectors. However, instead of having a two-channel output, as shown above in FIG. 4C for the device of FIGS. 1A and 1B, the device of FIG. 5 can have a three-channel output. Thus, while the data of FIG. 4C show a unique y1/y2 ratio for each incident angle within a range of from 0° to about ±60- to −90°, the device of FIG. 5 can provide unique sets of ratios (e.g. y1/y2 and y2/y3) for all incident angles within a full 360° range (0° to ±180°).

It will be understood that in the various exemplary devices discussed above, raw signal data—oscillation amplitude data—generated by the oscillation amplitude detectors 130 can be time domain data, i.e. the raw signal data will generally describe oscillation amplitude as a function of time. Thus, in any of the variations described herein, and with continued reference to FIGS. 1A and 1B, the device 100 can include a controller 180 in signal communication with each oscillation amplitude detector 130. The controller 180 can be configured to receive and Fourier transform signal data (i.e. oscillation amplitude data) from each oscillation amplitude detector 130, thereby converting the signal data from time domain to frequency domain data. Thus, after such processing by the controller 180, the signal data will represent, for each oscillation amplitude detector 130, oscillation amplitude as a function of incident flexural wave frequency. The controller can be further configured to generate a ratio of frequency domain oscillation amplitude data from the various oscillation amplitude detectors, or channels (e.g. y1/y2 or y1/y2/y3), and compare the generated ratio to a calibration data set or calibration curve, of the type shown in FIG. 4C, thereby identifying the incident angle of the flexural wave.

Figure 6:
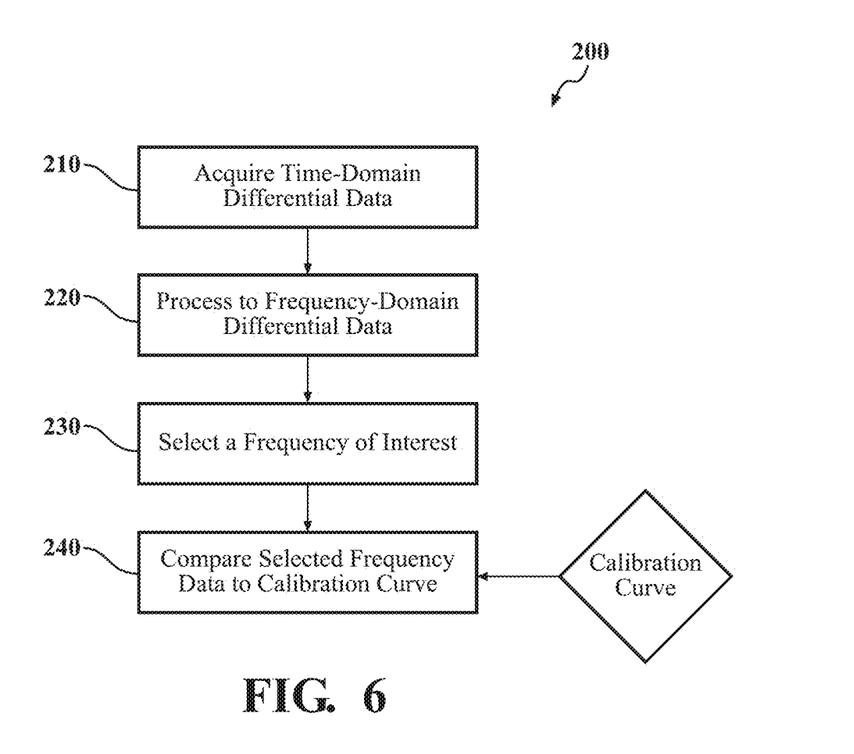
FIG. 6 is a flow chart of a method for locating a source of flexural waves in a structural plate.

Also disclosed is a method for locating the source of a flexural wave propagating in a structural plate. FIG. 6 shows a flow diagram of the method 200. The method 200 can include a step 210 of detecting resonance response from two mechanical resonators 120A, 120B with associated oscillation amplitude detectors 130A, 130B positioned on the plate 110, as described above. As described above, the resonance response from the two mechanical resonators 120 can be expressed as a response ratio (e.g. y1/y2). The method 200 can further include a step 220 of processing the data via Fourier transform to produce a frequency domain data set from the initially acquired time domain data set. The method can further include a step 230 of selecting a frequency of interest from the frequency domain data. The method 200 can further include a step 240 of comparing the resonance response ratio at the selected frequency to a calibration curve, of the type shown in FIG. 4C, to determine the incidence angle of the flexural wave, relative to the direction of separation of the mechanical resonators 120A, 120B. The location of the wave source will thus be determined, at least within a line defined by the incidence angle, although the distance of the source from the mechanical resonators may remain undetermined.

It will be understood that the method 200 of FIG. 6 is adaptable to the device 100 of FIG. 5, having three or more mechanical resonators 120 and an equivalent number of oscillation amplitude detectors 130.

Figure 7:
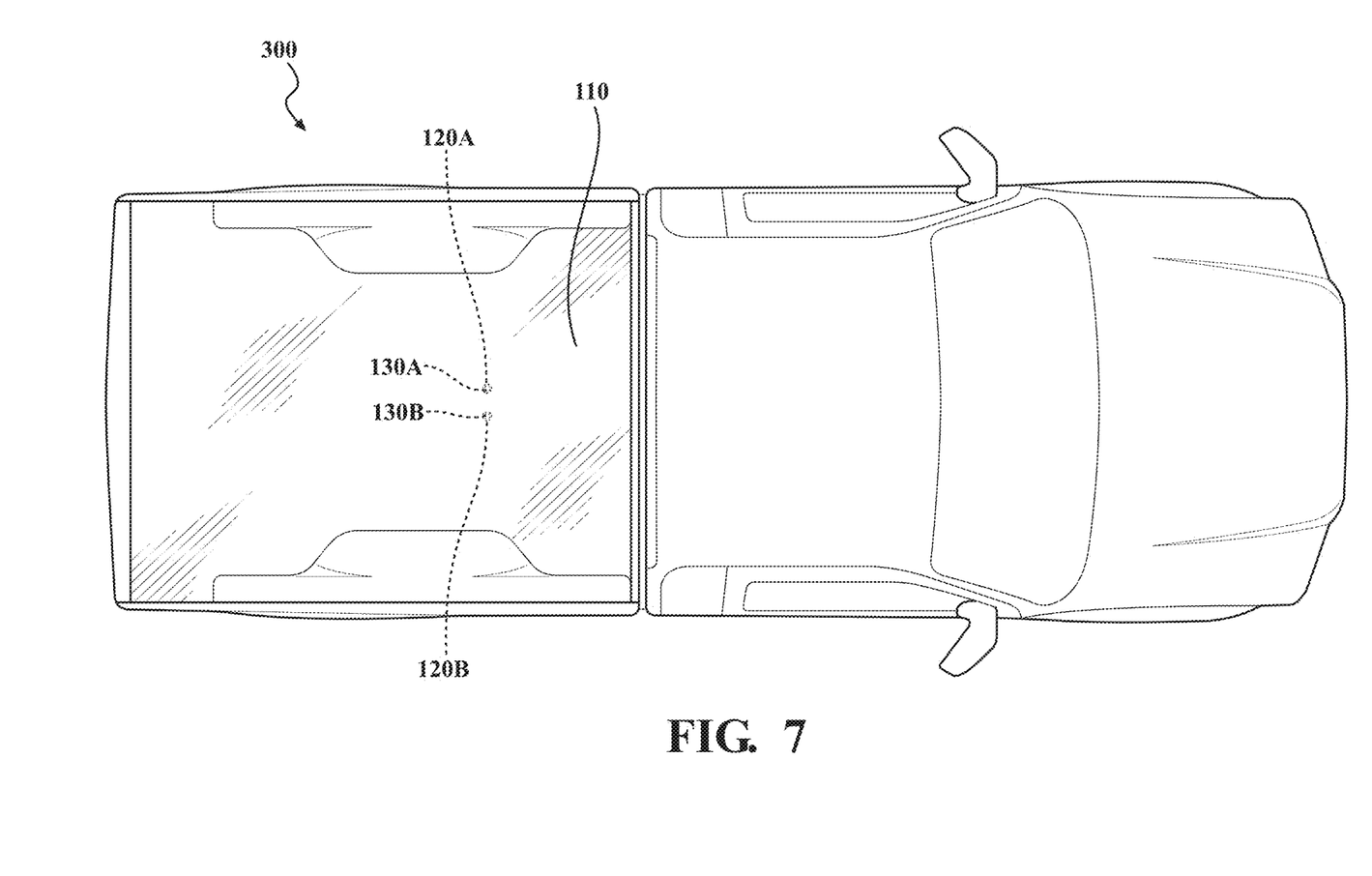
FIG. 7 is a top plan view of a motor vehicle having a plate bending wave incident angle detection device of the present teachings.

Also disclosed is a motor vehicle having a device for locating a source of flexural waves propagating through a vehicle structural plate. FIG. 7 shows a top plan view of such a vehicle 300. A circular array of resonators, as described above, is positioned on a structural plate of the vehicle 300. As described above, the solid plate 110 in the vehicle 300 can have a planar surface or a curvilinear surface, and is in other respects like the solid plate 110 described above. As such, the structural plate of the vehicle 300 will be referred to alternatively as a solid plate 110. In the example of FIG. 7, the solid plate 110 is in the bed of a truck, with two mechanical resonators 120A, 120B mounted to the underside of the truck bed. The solid plate 110 on which the mechanical resonators 120A, 120B is mounted could also be a cabin floorboard, the floor of an engine compartment, or any other solid plate 110 of sufficient lateral dimension, in which locating the source of a flexural wave could be beneficial. For example, the mechanical resonators 120A, 120B, with associated oscillation amplitude detectors 130A, 130B, can be reversibly attached to the vehicle 300 as a diagnostic tool for locating a source of noise or vibration in the vehicle 300.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A flexural wave direction sensor comprising:
 a plate;
 a first mechanical resonator positioned on the plate and configured to oscillate in response to an incident flexural wave;
 a second mechanical resonator positioned on the plate adjacent to the first mechanical resonator and configured to oscillate in response to the incident flexural wave;
 a first oscillation amplitude detector positioned to detect oscillation of the first mechanical resonator;
 a second oscillation amplitude detector positioned to detect oscillation of the second mechanical resonator; and
 a controller in signal communication with the first oscillation amplitude detector and the second oscillation amplitude detector, the controller being configured to determine a direction of the incident flexural wave using data received from the first oscillation amplitude detector and the second oscillation amplitude detector.

2. The sensor as recited in claim 1, wherein the controller is configured to receive and Fourier transform time domain oscillation data from each oscillation amplitude detector, producing frequency domain oscillation data from each oscillation amplitude detector.

3. The sensor as recited in claim 2, wherein the controller is further configured to generate a ratio of frequency domain oscillation data from each oscillation amplitude detector, and to compare the generated ratio to a calibration data set, identifying incident angle of the incident flexural wave.

4. The sensor as recited in claim 1, wherein each mechanical resonator comprises:
 a spring portion connected to the plate and formed of a resilient element having a spring constant, k; and
 a mass portion supported by the spring portion and having a mass, m,
wherein each spring-mass resonator has a resonance frequency, $f_0$, according to an equation:

$$f_0 = \frac{1}{2\pi}\sqrt{\frac{k}{m}},$$

and each spring-mass resonator of the plurality has substantially the same resonance frequency.

5. The sensor as recited in claim 4, wherein each of the first and second mechanical resonators has substantially the same spring constant, k, and mass, m.

6. The sensor as recited in claim 1, wherein each of the first and second mechanical resonators is substantially identical.

7. The sensor as recited in claim 1, comprising a flexural wave source positioned on the plate at a distance from the first and second mechanical resonators, and operable to generate the incident flexural wave such that the incident flexural wave propagates from the flexural wave source to the first and second mechanical resonators, defining an incidence angle.

8. The sensor as recited in claim 7, wherein each of the first and second mechanical resonators has a resonance frequency, $f_0$, that corresponds to a wavelength, $\lambda$, of the incident flexural wave by an equation:

$$\lambda = 2\pi \sqrt[4]{\frac{D}{\rho t (2\pi f_0)^2}},$$

wherein $\rho$ is plate density, t is plate thickness, and D is plate bending stiffness.

9. The sensor as recited in claim 1, wherein the first and second mechanical resonators are separated by a distance, d, that is within a range of from about $\lambda/10$ to about $\lambda/5$.

10. The sensor as recited in claim 1, wherein the plate is substantially planar.

11. A sensor for 360° angle detection of an incident flexural wave, the sensor comprising:
 a plate;
 at least three mechanical resonators positioned radially on the plate, such that each of resonator defines a vertex of an equilateral polygon, each mechanical resonator configured to oscillate in response to an incident flexural wave;
 at least three oscillation amplitude detectors, one associated with each mechanical resonator to detect oscillation of the mechanical resonator with which it is associated; and
 a controller in signal communication with the at least three oscillation amplitude detectors, the controller being configured to determine a direction of the incident flexural wave using data received from the at least three oscillation amplitude detectors.

12. The sensor as recited in claim 11, wherein each spring-mass resonator comprises:
 a spring portion connected to the plate and formed of a resilient element having a spring constant, k; and
 a mass portion supported by the spring portion and having a mass, m,
wherein each spring-mass resonator has a resonance frequency, $f_0$, according to an equation:

$$f_0 = \frac{1}{2\pi}\sqrt{\frac{k}{m}},$$

and each spring-mass resonator of the plurality has substantially the same resonance frequency.

13. The sensor as recited in claim 12, wherein each mechanical resonator has substantially the same spring constant, k, and mass, m.

14. The sensor as recited in claim 11, wherein each mechanical resonator is substantially identical.

15. The sensor as recited in claim 11, comprising a flexural wave source positioned on the plate at a distance from the at least three mechanical resonators, and operable to generate the incident flexural wave such that the incident flexural wave propagates from the flexural wave source to the at least three mechanical resonators, defining an incidence angle.

16. The sensor as recited in claim 15, wherein each of the at least three mechanical resonators has a resonance frequency, $f_0$, that corresponds to a wavelength, $\lambda$, of the incident flexural wave by an equation:

$$\lambda = 2\pi \sqrt[4]{\frac{D}{\rho t (2\pi f_0)^2}},$$

wherein $\rho$ is plate density, t is plate thickness, and D is plate bending stiffness.

17. A method for locating a source of a flexural wave propagating in a structural plate, the method comprising:
   detecting oscillation amplitude of two or more mechanical resonators positioned on the structural plate, and generating oscillation amplitude data, using an oscillation amplitude detector associated with each mechanical resonator;
   processing oscillation amplitude data via Fourier transform to produce a frequency domain data set;
   selecting a resonance response at a frequency of interest from the frequency domain data set; and
   comparing the selected resonance response, to a calibration data set to obtain an angle of incidence of the flexural wave on the mechanical resonators.

18. The method as recited in claim 17, wherein each mechanical resonator comprises an elastic material connected to the structural plate and a mass portion supported by the elastic material.

19. The method as recited in claim 17, comprising detecting oscillation amplitude of three or more mechanical resonators positioned on the structural plate.

20. The method as recited in claim 19, wherein the three or more mechanical resonators are positioned radially about a midpoint, each mechanical resonator occupying a vertex of an equilateral polygon.

* * * * *